Figure 1:

(No Model.) 2 Sheets—Sheet 1.
J. V. NICHOLS.
ELECTRIC CONDUCTOR.

No. 265,130. Patented Sept. 26, 1882.

Attest:
R. F. Barnes.
W. Fristy

Inventor:
Joseph V. Nichols.
By Parker W. Page.
Atty.

(No Model.) 2 Sheets—Sheet 2.

J. V. NICHOLS.
ELECTRIC CONDUCTOR.

No. 265,130. Patented Sept. 26, 1882.

Attest:
R. F. Barnes.
W. Fristy

Inventor:
Joseph V. Nichols
By Parker W. Page
atty.

UNITED STATES PATENT OFFICE.

JOSEPH V. NICHOLS, OF BROOKLYN, NEW YORK.

ELECTRIC CONDUCTOR.

SPECIFICATION forming part of Letters Patent No. 265,130, dated September 26, 1882.

Application filed March 13, 1882. (No model.)

*To all whom it may concern:*

Be it known that I, JOSEPH V. NICHOLS, a citizen of the United States, and a resident of Brooklyn, in the county of Kings and State of New York, have invented certain new and useful Improvements in Electric Conductors, of which the following is a specification, reference being had the drawings accompanying and forming a part of the same.

My invention relates to systems of insulating and protecting electric conductors in which one or a group of conductors is inclosed in a pipe, tube, or other protective casing and insulated by means of rings of non-conducting material strung on the wire or wires and fixed at intervals thereon; and it consists, first, in a method of applying or attaching the non-conducting rings or their equivalents; second, in the combination, with the conductors, of adherent beads, rings, or their equivalents, and also in improvements in the method of laying the same.

Heretofore telegraph, telephone, and other conductors have been protected by being laid in tubes or similar casings, and insulated from one another and the casings by the employment of perforated cylinders, disks, or rings, which have been strung over the conductors and fixed thereto at intervals. In every instance, however, the rings, so far as I am aware, were formed independently, then strung on the wires, and finally secured in place by means of wedges or allowed to remain loose. This is obviously a slow and expensive proceeding, and one not in every respect practicable, for the reason that the conductors, after the rings are applied, cannot be handled or transported without danger of displacing the rings. This by my invention I entirely obviate, and produce a conductor or group of conductors, in any length desired, with adherent beads or rings of non-conducting material, which may be handled, reeled, and transported with but slight risk of injury.

It is well known that if a wire of copper be raised to a high temperature at any point a small quantity of glass properly softened and applied thereto can be made to adhere, though the difficulty of securing adhesion is greatly increased, as wires of larger diameter are employed, partly on account of the difficulty of heating the conductor, and partly for the reason that on cooling the copper and glass have different rates of contraction. I have found that a species of glass, which I term "metallo-vitreous" cement, may be made to adhere to wires of copper or other metal very readily and perfectly, and, taking advantage of this fact, I form on a conductor of any length or diameter a number of rings or beads by heating the conductor in the flame of a blow-pipe at the points where I wish to apply the beads, and by the same flame soften a stick or tube of the material mentioned and wrap it around the heated portion. On cooling it will be found to adhere perfectly.

The material which I employ is a compound of silica, potash or soda, and metallic oxides, and may be produced in condition well suited for the purpose herein described by thoroughly mixing together and fusing fifty-eight parts, by weight, of oxide of lead, seventeen parts of silica, ten of oxide of iron, ten of oxide of copper, and five of potash or soda. The material which these form is highly non-conducting, resembling closely ordinary glass, except in color, and has approximately the same coefficient of expansion and contraction under varying temperatures as copper. Hence it can be readily caused to adhere to wires of any diameter by following the method described or any similar one.

My invention will be more fully described in connection with the accompanying drawings, where—

Figure 2:
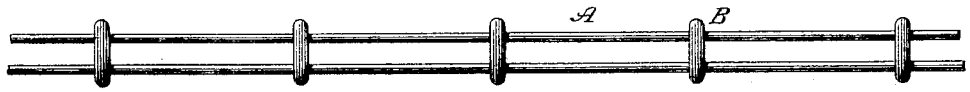
Figure 3:
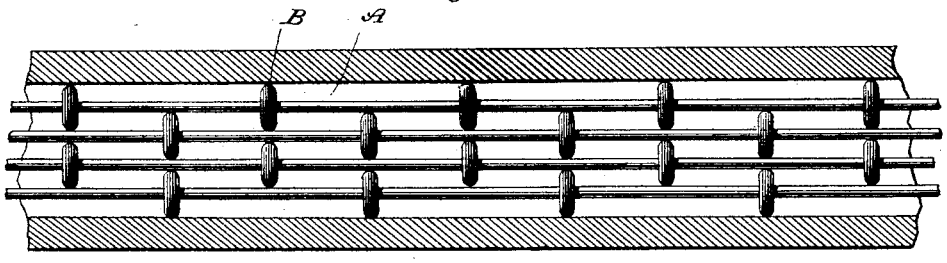
Figure 4:
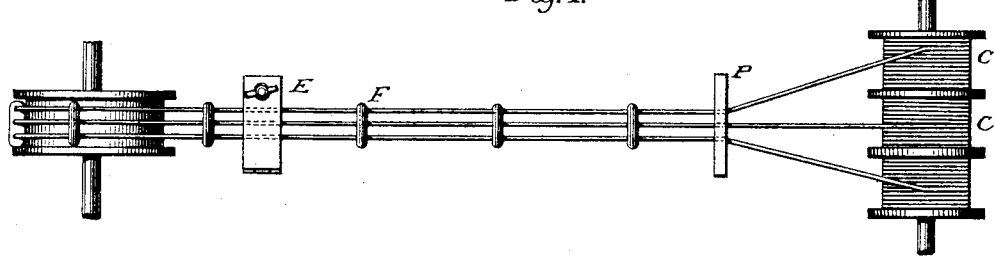
Figure 5:
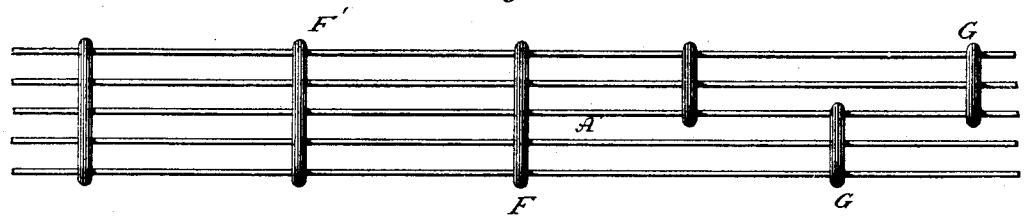
Figure 6:
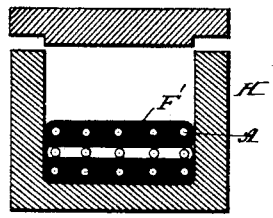

Figure 1 represents a short length of conductor with a number of adherent beads applied at intervals thereto. Fig. 2 illustrates two parallel conductors, which may be joined together by the beads. Fig. 3 illustrates in section a pipe containing a number of such wires. Fig. 4 is a diagrammatic illustration of an apparatus for joining together a group of conductors by means of non-conducting beads; Fig. 5, a view of a group of wires thus joined; and Fig. 6 is an illustration of the method of laying the same.

The wire A in the process of applying the beads is drawn from a suitable reel through the flame of a condensing blow-pipe. At close intervals—say two inches, more or less—it is allowed to heat, and at these points a small quantity, B, of glass, if the wire be of small diameter, but preferably metallo-vitreous cement, is applied in the manner above set forth. The wire may then be drawn off and wound on a reel. The same plan may be pursued with two or more wires simultaneously, if so desired; but where a number of wires greater than one are thus provided with beads it is advisable to connect them together in flat bands, as shown in Figs. 2, 4, and 5. For this purpose the wires from any desired number of reels C are drawn through a guide, P, and held in the same plane by a convenient clamp, E. The cement is then applied in a manner similar to that followed in the case of a single wire. The soft cement is, however, in this case carried from one wire to another, or wound about them to form the connecting-supports F. All the wires may be connected by means of the cement applied as shown at F' in Fig. 5, or the connections may be formed only across a portion of the wires by cement applied as at G, Fig. 5. This latter method is preferable, from the fact that the connections are less liable to break.

When single-beaded wires are to be laid underground or in a tube the arrangement shown in Fig. 3 is followed. Here the wires are disposed so that the beads on one wire come between the beads on the others, as far as practicable. By this means the wires are held out of contact with each other and the casing by which they are confined. When groups or ribbons of wires, as shown in Figs. 2 and 5, are to be laid they may be drawn into a tube; or, if they contain a number of wires greater than two or three, they are to be laid in a sectional tube, trough, or similar casing, H, as shown in Fig. 6, in which the upper and lower parts are separable. In both cases the intervening spaces within the tube or trough may be filled with a proper insulating substance.

I have now described the best manner of which I am aware in which my invention is or may be carried into effect. I would add that I do not confine myself to the precise method of preparing the conductors herein described, nor to the use of glass or the metallo-vitreous cement alone as the material for the beads and supports. I regard any insulating substance that may be welded or caused in other ways to adhere to the conductors and form an insulating-support similar to the vitreous beads herein described as equally within the scope of my invention.

What I therefore claim is—

1. The method herein described of insulating an electric conductor or assemblage of electric conductors, which consists in forming at intervals thereon adhering beads or rings of insulating material, substantially as and for the purpose set forth.

2. The method of insulating an electric conductor or assemblage of electric conductors, which consists in heating the same at given points and forming or welding on the same, while hot, fusible beads or equivalent masses of insulating material, substantially as described.

3. The combination, with an electric conductor or assemblage of electric conductors, of adherent beads or equivalent masses of insulating substance disposed thereon at intervals, as set forth.

4. The combination, with two or more electric conductors, of adherent masses of insulating material applied to the conductors at intervals and binding them mechanically together, substantially as described.

5. The combination, with two or more uninsulated electric conductors, of connecting masses of adherent non-conducting material applied to all or a portion of the wires at intervals, substantially as described.

6. The combination, with a sectional trough or casing, of one or more groups or assemblages of electric conductors, each of said groups being formed as a ribbon by connecting masses of adherent insulating material applied thereto at intervals, as set forth.

In testimony whereof I have hereunto set my hand this 9th day of March, 1882.

JOSEPH V. NICHOLS.

Witnesses:
R. F. BARNES,
W. FRISBY.